United States Patent Office 3,517,043
Patented June 23, 1970

---

3,517,043
METHOD FOR THE PREPARATION OF SALTS OF ORGANOFLUOSILICIC ACIDS IN NONAQUEOUS SOLVENTS
Richard Muller and Christian Dathe, Radebeul, and Dieter Mross, Dresden, Germany, assignors to Institut für Silikon- und Fluorkarbon-Chemie, Radebeul, near Dresden, Germany
No Drawing. Continuation of application Ser. No. 443,165, Mar. 26, 1965. This application July 29, 1968, Ser. No. 750,712
Int. Cl. C07f 7/12
U.S. Cl. 260—448.2                                     2 Claims

ABSTRACT OF THE DISCLOSURE

Method of producing salts of low molecular weight hydrocarbon fluorosilicic acids which comprises reacting low molecular weight hydrocarbon trifluorosilanes with an ammonium-, quaternary ammonium-, or alkali metal fluoride in organic solvents which are inert under the reaction conditions. The complex salts thus obtained are useful agents in chemical reactions e.g. separations, arylations, alkylations and reductions.

---

This application is a continuation of Ser. No. 443,165, filed Mar. 26, 1965, now abandoned.

This invention relates to methods for the preparation of salts of organo-fluosilicic acids in nonaqueous solvents.

Our copending application, Ser. No. 443,087, filed Mar. 26, 1965 describes a process, according to which organotrifluorosilanes are converted into the corresponding salts of organofluosilicic acids by being reacted with metallic fluorides, including ammonium fluoride, in the absence of water or in an aqueous medium.

The present application extends this process more specifically to the preparation of such salts in nonaqueous solvents.

Accordingly, an object of this invention is to provide an improved method of preparing salts of organo-fluosilicic acids in nonaqueous organic solvents particularly such solvents which are inert under the reaction conditions.

The method is carried out so that the metallic fluoride is suspended in the respective solvent and in that the fluorosilane is either introduced into the stirred suspension as gas or is added, drop by drop, in liquid or dissolved form. After the reaction is completed, it is merely necessary to vacuum-filter the complex salt that has formed.

The method is not limited to the use of organotrifluorosilanes. If complex formers are employed which can at the same time be used as fluorination agents for organosilanes having the general formula $RSiX_3$ (wherein R is an organic radical, X is any atom or group of atoms interchangeable with fluorine), the fluorination and the production of the complex salt may be combined in one stage.

Example 1

For the purpose of removing adherent traces of moisture, 20 g. of finely powdered ammonium fluoride is shaken four times, each time with 50 ml. of non-denatured ethanol dried by boiling with activated magnesium chips and purified by distillation, the ethanol is removed each time by decanting, and the ammonium fluoride is then rinsed with 50 ml. of the same ethanol in a 250 ml. three-necked flask, which is provided with a stirrer, inlet and discharge. The loss of ammonium fluoride due to decanting amounts to 1.5 g. Within 100 minutes, 27 g. of methyl trifluorosilane are now introduced into the well-stirred suspension; this causes a perceptible heating to occur after some time. After the methyl trifluorosilane has been introduced, the weight in the reaction vessel has increased by 12 g., while 11.5 g. of the fluorosilane introduced are captured again in a cooling trap. The reaction mixture is vacuum-filtered and is washed with alcohol, three times.

Analysis of the dried, finely crystalline residue (20 g.) shows 25% N (calculated for $NH_4F$, 37.81% for $(NH_4)_2(CH_3SiF_5)$ 16.1% N). The nitrogen value indicates a conversion of about 56%.

Example 2

32.5 g. of $CH_3SiF_3$ are introduced under ice cooling within 2 hours into a suspension of 25 g. of $NH_4F$ which, as described above, is washed four times with 100 ml. of 99.8% pure ethanol and is subsequently rinsed with 100 ml. of the same ethanol. 18.5 g. of the $CH_3SiF_3$ are absorbed by the reaction mixture, 12.5 g. condense in a sequentially arranged cooling trap. Treatment in the above described manner produces 27.5 g. of dry, crystalline substance (31.6% N). Of this amount, 13 g. are dissolved in 50 ml. of water and are mixed with 75 ml. of a 45% aqueous potassium fluoride solution. The precipitated difficulty soluble $K_2(CH_3SiF_5)$ is vacuum-filtered and dried. (*Analysis.*—Found: 44.2% F; calculated: 43.92%).

Example 3

20 g. of ammonium fluoride heated in an ammonia stream for drying is suspended in 250 ml. of acetone dried with potassium carbonate and calcium sulfate, in a three-necked flask comprising a gas inlet tube, stirrer, reflux condenser, gas discharge tube and sequentially arranged condensation trap. Excess $CH_3SiF_3$ is then passed therethrough for 8 hours under stirring; the non-absorbed $CH_3SiF_3$ may be recycled. The solid product in the reaction flask is vacuum-filtered, is washed with anhydrous acetone and is dried. 40 g. of solid product are obtained. The increase in weight of 20 g. corresponds to a conversion of the ammonium fluoride to ammonium methyl pentafluosilicate $(NH_4)_2(CH_3SiF_5)$ of 74%. A portion of the product is dissolved in water, and the potassium methyl pentafluosilicate is precipitated with a KF solution. (*Analysis.*—$K_2(CH_3SiF_5)$ found: 44.0% F; calculated: 43.92%.)

Example 4

10 g. of finely ground ammonium fluoride, dried as described in Example 3, are suspended in 100 ml. of acetonitrile dried with phosphorus pentoxide, and $CH_3SiF_3$ is passed therethrough for 16 hours. The solid product is vacuum-filtered, is washed with anhydrous acetonitrile and is dried. This produces 21 g. of solid product corresponding to a conversion of 82%. The $K_2(CH_3SiF_5)$ is precipitated with a potassium fluoride solution. (*Analysis.*—$K_2(CH_3SiF_5)$ found: 43.8% F.)

Example 5

10 g. of ammonium fluoride, dried as described in Example 3, is suspended in 100 ml. of benzene dried with $P_2O_5$, and $CH_3SiF_3$ is introduced for 8 hours. The solid product (15 g. corresponding to 37% conversion in relation to the ammonium fluoride) is dissolved in water, and the $K_2(CH_3SiF_5)$ is precipitated by the addition of a potassium fluoride solution. (*Analysis.*—$K_2(CH_3SiF_5)$ found: 44.4% F.)

Example 6

The reaction is carried out, as described in Example 5, in petroleum ether which is dried with phosphorus pentoxide. 12 g. of solid product are obtained (conversion: 15%). (*Analysis.*—$K_2(CH_3SiF_5)$ found: 43.3% F.)

Example 7

10 g. of potassium fluoride, calcined at 400 to 450° C., are suspended in 120 ml. of acetone dried as described in Example 3, and CH₃SiF₃ is passed therethrough for 8 hours. The solid product is then vacuum-filtered, is washed with acetone and is dried. 15 g. of solid product are obtained. The conversion rate is 58%. The product is freed of KF by being washed with water. (*Analysis.* — K₂(CH₃SiF₅) found: 43.8% F.)

Example 8

20 g. of KF dried at 400 to 450° C. are suspended in 150 ml. of acetonitrile dried as described in Example 4, and CH₃SiF₃ is passed therethrough for 8 hours. 30 g. of solid product (conversion rate: 58%) are obtained; the product is treated as described in Example 7. (*Analysis.*— K₂(CH₃SiF₅) found: 43.1% F.)

Example 9

10 g. of KF dried at 400 to 450° C. are suspended in 150 ml. of benzene, which is dried as described in Example 5, and CH₃SiF₃ is introduced for 8 hours. The isolated solid product (12 g.) had a C value of 1.91%.

K₂(CH₃SiF₅)

calculated: 5.55% C.) On the basis of the C value, the resulting mixture contains 34.4% K₂(CH₃SiF₅).

Example 10

5 g. of KF dried at 400 to 450° C. are suspended in 100 ml. of petroleum ether dried as described in Example 6, and CH₃SiF₃ is introduced for 16 hours, thereby producing 5.25 g. of solid product (conversion: 6%).

Example 11

12 g. of ammonium fluoride, rinsed with dry acetone, are suspended in 100 ml. of acetone dried as described in Example 3, and 26.5 g. of phenyl trifluorosilane are added drop by drop. The reaction mixture is then stirred for three hours. The solid product is vacuum-filtered, is washed with acetone and is dried. 38 g. of solid substances are obtained (conversion rate: 99%). The difficultly soluble potassium phenyl pentafluorosilicate (K₂(C₆H₅SiF₅)) is precipitated from an aqueous solution by means of a potassium fluoride solution. K₂(C₆H₅SiF₅) calculated: 34.12% F; found: 34.15 F.

Example 12

12 g. of ammonium fluoride, which is rinsed with dry acetone, are suspended in 100 ml. of acetonitrile dried as described in Example 4. 26.5 g. of phenyl trifluorosilane are added drop by drop, and stirring is continued for 4 hours. 37 g. of solid product (conversion rate: 95%) are isolated and are converted into K₂(C₆H₅SiF₅) as per Example 11. K₂(C₆H₅SiF₅) found: 34.02% F.

Example 13

6 g. of ammonium fluoride, dried as described in Example 3, are suspended in 100 ml. benzene treated as described in Example 5, and 14 g. of phenyl trifluorosilane are added drop by drop; the mixture is then stirred for 8 hours. The resulting solid product (9 g.) contains 22.1% N. (Ammonium fluoride calculated: 37.81% N;

(NH₄)₂(C₆H₅SiF₅)

calculated: 11.86% N. On the basis of the N value, the resulting mixture contains 60.5% (NH₄)₂(C₆H₅SiF₅.)

Example 14

A product prepared as in Example 13 in 100 ml. petroleum ether dried as described in Example 6 produced 9 g. of solid product containing 21.0% N. This corresponds to a content of 64.8% (NH₄)₂(C₆H₅SiF₅).

Example 15

10 g. of KF dried at 400 to 450° C. are suspended in 100 ml. of acetone dried as described in Example 3, and 15 g. of phenyl trifluorosilane are added, whereupon stirring is continued for five hours. 24 g. (conversion: 100% in relation to KF) of solid product were separated; the solid product is washed with water and dried. (*Analysis.*— K₂(C₆H₅SiF₅) found: 33.8% F.)

Example 16

10 g. of KF dried at 400 to 450° C. are suspended in 100 ml. of acetonitrile dried as described in Example 4 and after addition of 15 g. phenyltrifluorosilane are stirred for five hours. This produces 22 g. (conversion: 87% in relation to KF) of solid product, which is treated as per Example 15. (*Analysis.* — K₂(C₆H₅SiF₅) found: 33.4% F.)

Example 17

10 g. of KF dried at 400 to 450° C. are suspended in 100 ml. of benzene dried as described in Example 5, and 12.5 g. of phenyl trifluorosilane are added, whereupon the mixture is stirred for five hours. The resulting solid product (11 g.) had a C value of 5.33%. (K₂(C₆H₅SiF₅) calculated: 25.89% C.) The resulting product therefore contains 20.6% K₂(C₆H₅SiF₅).

Example 18

10 g. of KF dried at 400 to 450° C. are suspended in 110 ml. of petroleum ether dried as described in Example 6, to which 12.5 g. of phenyl trifluorosilane are added; the mixture is then stirred for five hours. The solid product (11 g.) had a C value of 5.93%. (K₂(C₆H₅SiF₅) calculated: 25.89% C.) Based thereon, the resulting product contains 22.9% K₂(C₆H₅SiF₅).

Example 19

Excess methyl trifluorosilane is conducted through an ice-cooled solution of 4 g. of tetraethyl ammonium fluoride in 8 g. of distilled ethanol dried over magnesium chips. The increase in weight amounts to about 3 g. This solution is concentrated first over calcium chloride and subsequently over phosphorus pentoxide. There crystallizes a colorless, hygroscopic compound, from which methyl trifluorosilane escapes when hydrochloric acid or nitric acid is added. The values found by analysis (44.6% C, 10.5% N, 29.5% F) allowed to assume the existence of the compound (C₂H₅)₄N(CH₃SiF₄) (calculated: 43.35% C, 9.30% H, 30.48% F).

Example 20

5 g. of NaF dried at 450° C. are suspended in 100 ml. dry acetonitrile, and CH₃SiF₃ is passed therethrough under stirring for six hours. The solid product was vacuum-filtered, was washed with acetonitrile and dried (amount: 10.4) g. (*Analysis.*—Na₂(CH₃SiF₅) calculated: 6.51% C; found: 6.19% C.) Based on the C value found, the content of Na₂(CH₃SiF₅) is 95%.

Example 21

20 g. of ammonium fluoride are suspended in 150 ml. of acetonitrile. 22 g. of phenyl trichlorosilane are added drop by drop, and the mixture is stirred at room temperature for 10 hours. The solid product is then vacuum-filtered, is washed with acetonitrile and acetone and dried. A portion of the solid product is dissolved in H₂O, and the K₂(C₆H₅SiF₅) is precipitated with an about 40% KF solution. 5 g. of mixture produce 1.25 g. of K₂(C₆H₅SiF₅). Based on this amount, the present mixture contains 6.14 g. of (NH₄)₂(C₆H₅SiF₅), corresponding to 25% of the theoretical amount. (*Analysis.*—K₂(C₆H₅SiF₅) calculated: 34.12% F; found: 34.36% F.)

As various changes might be made in the embodiment of the invention herein shown without departing from the spirit thereof, it is understood that all matter herein described or illustrated is not limiting except as set forth in the appended claims.

We claim:

1. A method of producing salts of low molecular weight hydrocarbon fluorosilicic acids, which comprises reacting low molecular weight hydrocarbon trifluorosilanes with an ammonium fluoride, alkali metal fluoride, or quarternary ammonium fluoride in an organic solvent which is inert under the reaction conditions.

2. The method according to claim 1, which comprises carrying out the reaction of low molecular weight hydrocarbon trifluorosilanes prepared in situ from the respective trichlorosilanes with an excess of one of said fluorides, whereby exchange of chlorine and fluorine is effected and subsequently, in the same operation, said low molecular weight hydrocarbon fluorosilicates are obtained.

References Cited

FOREIGN PATENTS

| | | |
|---|---|---|
| 981,268 | 1/1965 | Great Britain. |
| 1,395,223 | 3/1965 | France. |

OTHER REFERENCES

Journal fur Praktische Chemie, December 1963, pp. 236, 237.

DELBERT E. GANTZ, Primary Examiner

P. F. SHAVER, Assistant Examiner